Patented Sept. 27, 1927.

1,643,805

UNITED STATES PATENT OFFICE.

RICHARD H. BOTS, OF SYRACUSE, NEW YORK.

PROCESS OF MANUFACTURING VANILLIN.

No Drawing.   Application filed May 25, 1926.   Serial No. 111,640.

It is a known fact that by careful oxidation the aromatic compounds having a lateral chain $-CH=CH-CH_3$ are transformed into the corresponding aldehydes. Thus iso-eugenol is transformed into vanillin.

Although it has been stated (see Chemical Trade Journal & Chemical Engineer, vol. 77, page 181) that "attempts have been made to find methods for the direct oxidation of iso-eugenol, utilizing organic nitro compounds as the oxidizing agents, but these attempts have not met with success", I have succeeded in working out a process using nitro-benzol as an oxidizing agent with very satisfactory results, yields being better than those published in the literature.

For the success of my process it is essential that the oxidation should be carried on in the presence of a free alkali and in the presence of aniline which, to all appearances, acts as a diluent.

On starting with eugenol or with oil of cloves, the isomerization may be carried on in the usual way, i. e. using KOH as the isomerization agent without the use of any organic solvent, at around 200° C. The mass so obtained without the usual liberation of iso-eugenol is then dissolved in an excess of aniline, a NaOH solution added, and the mass may be then treated with nitro-benzol in an apparatus equipped with stirrer and heating appliances.

However, far better results are obtained by carrying on the isomerization with KOH in the presence of an excess of aniline. This process is described in my co-pending application for patent Serial No. 111,639, filed May 25, 1926.

The mass is then cooled down somewhat, and before solidification it is drawn off into another apparatus equipped with stirrer and heating appliances. When the mass has sufficiently cooled down, nitro-benzol is added and also a fairly strong solution of a free alkali, NaOH being preferred. The mass is then heated. The reaction soon sets in. If the temperature is kept between 100° and 105° C. it can be easily controlled. If, however, the mass has been heated rapidly to around 115° C., the reaction is somewhat violent; even on removing the heat supply the temperature will reach 130°–135° C. in a few minutes, a rather violent ebullition taking place for a few minutes. By keeping the temperature around 100° C. the reaction should be complete in two hours and pure vanillin may be recovered, using any suitable method of recovery and purification.

My process is also distinguished by the fact that the nitro-benzol, by giving up its oxygen, is itself reduced to azo-benzol, a very valuable by-product which, at a relatively small cost can be transformed into benzidine without the use of zinc dust.

*Example I.*—100 c. c. of oil of cloves were treated with KOH in the usual process of isomerization without the use of any solvent. The potassium salt of iso-eugenol so obtained was cooled down to around 170° C. 400 c. c. of moist aniline were added. The mixture was kept for 3 hours at around 100° C. until the solid mass had gone into solution. 100 c. c. of a caustic soda solution 1:1 were added. The mixture was heated to around 125° C; superheated steam was introduced until about 100 c. c. of aniline had distilled over. The mass was then drawn off into another apparatus containing 300 c. c. of nitro-benzol. The mass was heated, using an oil bath, and a good efficient stirring being applied. The temperature of the mass was raised rapidly to 117° C. At this point the oil bath was removed. The temperature crept up gradually until in about 6 minutes it had reached 133° C., where it remained for 3–4 minutes, and then dropped gradually. In the meantime the mass had become almost solid and a rather violent ebullition had taken place.

When the temperature had dropped to 100° C. a large amount of water was added and the vanillin extracted, precipitated and purified. The total time for the oxidation was 45 minutes. The yields of pure vanillin vary from 69% to 72% of the theoretical possible amount.

*Example II.*—100 gr. of oil of cloves, containing 85% of eugenol, were added to a solution of 50 gr. of KOH in 200 c. c. of water in a small iron retort equipped with a bottom outlet. The apparatus was heated, using a naked flame. At 125° C. 15 c. c. of terpenes had been recovered. 400 gr. of aniline were then added and the mass was heated still higher. At 178° C. a small amount of KOH was drawn off. The heating was continued until about 100 gr. of aniline had distilled over. Then the flame was removed. While the mass was still liquid it was drawn off into another apparatus equipped with a stirrer. When the mass was sufficiently cooled down 300 gr. of nitro-benzol and 100 gr. of a caustic soda solution (1 : 1) were added. The stirrer was set in motion. Then, using an oil bath, the temperature was kept fluctuating between 100° and 103° C. for two hours. After 5 minutes of stirring and heating at around 100° C. a small precipitation could be seen. After 30 minutes' stirring the precipitation was very heavy, the mass becoming very thick. The total time so far was 3 hours.

The mass was then steam-distilled, a mixture of aniline and nitro-benzol being recovered, which could be either fractionated or worked up into aniline. There remained in the still a mixture of crude azo-benzol and an aqueous solution of an alkali salt of vanillin, and of a free alkali. In a regular run the yields of pure vanillin (melting point 81.75° C.–82° C.) should not be less than 75% of the theoretical amount. Yields as high as 79.3% have been obtained. There is also obtained about 80 gr. of crude azo-benzol.

The advantages of my process over the known processes using oil of cloves as a starting point are:

1. Extreme simplicity of operation;
2. Simplicity of apparatus;
3. Low cost of raw materials used for the transformation of oil of cloves;
4. High yields: hence lower production costs.
5. Production of azo-benzol, a valuable by-product.

What I claim is:

1. The process of oxidizing a carbon compound having a benzene nucleus with a lateral chain $-CH=CH-CH_3$ to produce the corresponding aldehyde, which consists in treating said compound with nitro-benzol.

2. The process of oxidizing a carbon compound having a benzene nucleus with a lateral chain $-CH=CH-CH_3$ to produce the corresponding aldehyde, which consist in treating said compound with nitro-benzol and a free alkali.

3. The process of oxidizing a carbon compound having a benzene nucleus with a lateral chain $-CH=CH-CH_3$ to produce the corresponding aldehyde, which consists in treating said compound with nitro-benzol and an excess of caustic soda.

4. The process of producing vanillin, which consists in treating an alkali compound of iso-eugenol with nitro-benzol and a free alkali.

5. The process of producing vanillin, which consists in treating an alkali compound of iso-eugenol with nitro-benzol and an excess of NaOH.

6. The process of producing vanillin, which consists in treating a potassium compound of iso-eugenol with nitro-benzol and a free alkali.

7. The process of producing vanillin, which consists in treating a potassium compound of iso-eugenol with nitro-benzol and an excess of NaOH.

8. The process of oxidizing a carbon compound having a benzene nucleus with a lateral chain $-CH=CH-CH_3$ to produce the corresponding aldehyde, which consists in dissolving said compound in an amino compound and treating said solution with nitro-benzol in the presence of a free alkali.

9. The process of oxidizing a carbon compound having a benzene nucleus with a lateral chain $-CH=CH-CH_3$ to produce the corresponding aldehyde, which consists in dissolving said compound in aniline and treating said solution with nitro-benzol in the presence of a free alkali.

10. The process of oxidizing a carbon compound having a benzene neucleus with a lateral chain $-CH=CH-CH_3$ to produce the corresponding aldehyde, which consists in dissolving said compound in aniline and treating said solution with nitro-benzol in the presence of NaOH.

11. The process of producing vanillin, which consists in dissolving a potassium compound of iso-eugenol in an amino compound and then treating the mixture with nitro-benzol in the presence of a free alkali.

12. The process of producing vanillin, which consists in dissolving a potassium compound of iso-eugenol in aniline and then treating the mixture with nitro-benzol in the presence of a free alkali.

13. The process of producing vanillin, which consists in dissolving a potassium compound of iso-eugenol in aniline and then treating the solution with nitro-benzol in the presence of an excess of NaOH.

14. The process of producing vanillin, which consists in dissolving a potassium compound of iso-eugenol in a suitable solvent and then treating the solution with nitro-benzol in the presence of an excess of NaOH.

15. The process of producing vanillin, which consists in dissolving an alkali compound of iso-eugenol in aniline and then treating the solution with nitro-benzol in the presence of a free alkali.

16. The process of producing vanillin, which consists in dissolving an alkali compound of iso-eugenol in aniline and then treating the solution with nitro-benzol in the presence of NaOH.

17. The process of producing vanillin, which consists in dissolving a potassium compound of iso-eugenol in aniline and then treating the solution with nitro-benzol in the presence of a 50/50 NaOH solution (or 1 p. of NaOH dissolved in 1 p. of water).

18. The process of producing vanillin, which consists in treating an alkali compound of iso-eugenol with aniline and nitro-benzol and a free alkali.

19. The process of producing vanillin, which consists in treating an alkali compound of iso-eugenol with an amino compound and nitro-benzol and a free alkali.

In testimony whereof I hereunto affix my signature.

RICHARD H. BOTS.